United States Patent [19]
Harris

[11] Patent Number: 4,765,505
[45] Date of Patent: Aug. 23, 1988

[54] DELAYED ACTUATION FUEL CAP

[75] Inventor: Robert S. Harris, Connersville, Ind.

[73] Assignee: Stant Inc., Connersville, Ind.

[21] Appl. No.: 129,416

[22] Filed: Nov. 25, 1987

Related U.S. Application Data

[63] Continuation of Ser. No. 42,791, Apr. 27, 1987, abandoned, which is a continuation-in-part of Ser. No. 888,575, Jul. 22, 1986, Pat. No. 4,676,390.

[51] Int. Cl.$^4$ .................... B65D 41/04; B65D 41/32
[52] U.S. Cl. ........................... 220/288; 220/DIG. 33
[58] Field of Search ............... 220/288, 303, 304, 203, 220/DIG. 33

[56] References Cited

U.S. PATENT DOCUMENTS

| | | |
|---|---|---|
| 2,006,752 | 7/1935 | Swank . |
| 2,591,562 | 4/1952 | Levell . |
| 2,792,964 | 5/1957 | Reese et al. . |
| 2,865,531 | 12/1958 | Gorst et al. . |
| 2,964,214 | 12/1960 | Stannard . |
| 2,990,971 | 7/1961 | Enell . |
| 3,082,905 | 3/1963 | Friend . |
| 3,098,636 | 7/1963 | Contella .................. 251/98 |
| 3,111,239 | 11/1963 | Ivins . |
| 3,112,840 | 12/1963 | Miller et al. . |
| 3,147,881 | 9/1964 | Friend . |
| 3,163,315 | 12/1964 | Wilson . |
| 3,186,580 | 6/1965 | Previte . |
| 3,203,445 | 8/1965 | McCormick ............ 137/493.4 |
| 3,373,894 | 3/1968 | Johnson . |
| 3,434,621 | 3/1969 | Previte . |
| 3,587,912 | 6/1971 | Ohta et al. .................. 220/40 |
| 3,616,960 | 11/1971 | Miller et al. . |
| 3,703,245 | 11/1972 | Brewer . |
| 3,854,911 | 12/1974 | Walker .................. 55/387 |
| 4,036,399 | 7/1977 | Gerdes ................... 220/303 |
| 4,177,931 | 12/1979 | Evans .................... 220/288 |
| 4,228,915 | 10/1980 | Hooper et al. .......... 220/304 |
| 4,245,751 | 1/1981 | Neiman .................. 220/204 |
| 4,271,976 | 6/1981 | Detwiler ................ 220/206 |
| 4,337,873 | 7/1982 | Johnson ................ 220/303 |
| 4,458,823 | 7/1984 | Baker ..................... 220/288 |
| 4,458,824 | 7/1984 | Baker et al. ............ 220/288 |
| 4,494,673 | 1/1985 | Hiraishi .................. 220/288 |
| 4,498,493 | 2/1985 | Harris .................... 137/469 |
| 4,572,396 | 2/1986 | Kasugai et al. ......... 220/203 |
| 4,579,244 | 4/1986 | Fukuta ................... 220/210 |
| 4,588,102 | 5/1986 | Kasugai .................. 220/203 |
| 4,676,390 | 6/1987 | Harris .................... 220/203 |
| 4,678,097 | 7/1987 | Crute .................... 220/288 |

Primary Examiner—George T. Hall
Attorney, Agent, or Firm—Barnes & Thornburg

[57] ABSTRACT

A fuel cap is provided for closing the threaded filler neck of a fuel tank. The cap includes a housing having threads for engaging the filler neck, a seal for sealingly engaging said filler neck upon rotation of the housing in a first direction, and a handle for rotating the housing relative to the filler neck. The cap further includes a hub for providing a lost-motion driving connection between the handle and the housing. The lost motion of the hub acts to permit a predetermined amount of relative movement of the handle and the filler neck before the housing can be rotated relative to the filler neck sufficiently to break the seal.

15 Claims, 1 Drawing Sheet

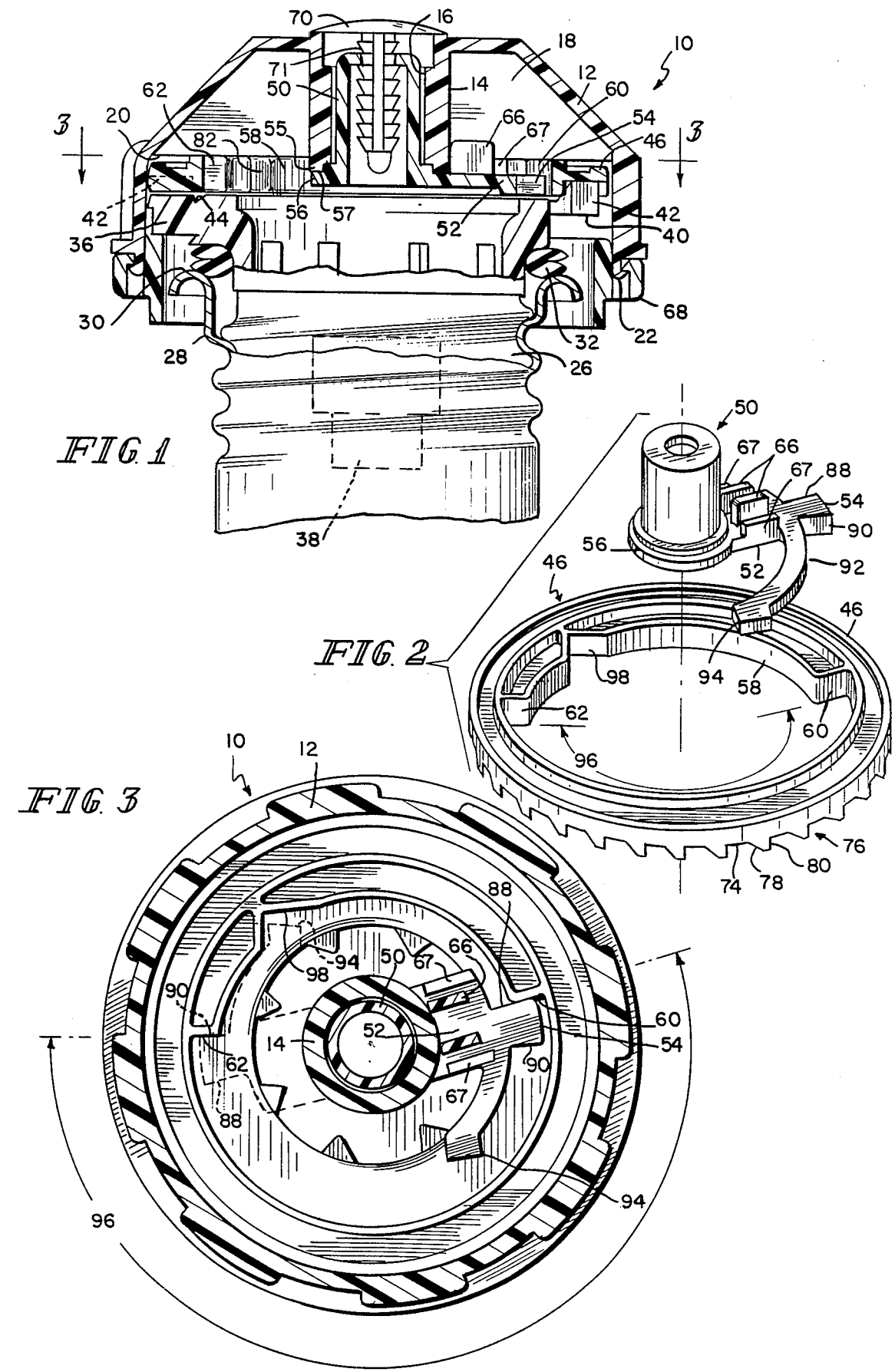

DELAYED ACTUATION FUEL CAP

This application is a file wrapper continuation of application Ser. No. 07/042,791, filed Apr. 27, 1987, now abandoned, which is a continuation-in-part of application Ser. No. 06/888,575, filed July 22, 1986, now U.S. Pat. No. 4,676,390, issued June 30, 1987.

BACKGROUND AND SUMMARY OF THE INVENTION

The present invention relates to fuel caps for closing filler necks of vehicle fuel tanks. More particularly, the present invention relates to a threaded fuel cap that provides a lost motion driving connection between a handle and a closure member to delay actuation of the closure member in a cap-removal direction following an accidental impact to the handle.

Conventional fuel caps for closing threaded filler necks of vehicle fuel tanks generally include an outer handle or shell that is coupled for rotation to a closure member or housing. The housing is normally formed to include threads that are configured to engage corresponding threads formed on the filler neck. A direct driving connection between the handle and the housing is normally provided. It is known to provide a torque override driving connection between the handle and the housing, however this torque override driving connection is only used to prevent overtightening of the housing within the filler neck. Thus, for all practical purposes, conventional fuel caps for threaded filler necks utilize a fixed, direct driving connection between the handle and the housing which results in coordinated and direct rotational movement of the housing relative to rotational movement of the handle.

One problem with conventional fuel caps of that type is that, because the handle is directly connected to the housing, any unintentional movement of the handle in the cap-removal direction will break the seal between the housing and the filler neck. Once the seal between the housing and the filler neck is broken, it is possible for fuel or fuel vapor to escape from the filler neck. In some instances, such as during a vehicle accident, a release of fuel or fuel vapor can potentially create a hazardous condition.

Threaded fuel caps that engage threads in the filler neck of vehicles are now widely used because of their ease of installation and removal, and because of their excellent sealing characteristics. Therefore, it would be advantageous to provide a fuel cap in which the handle is configured to rotate a predetermined amount in the cap-removal direction without a resulting rotation of the closure or housing to break the seal between the housing and the filler neck. Ideally, when the cap is properly installed, limited unintentional movement of the handle in the cap-removal direction will not interfere with the seal established between the housing and the filler neck. This would be advantageous during a vehicle accident in which the handle of the fuel cap can possibly be rotated due to disruption of the body portion of the vehicle surrounding the fuel cap or to any other external impact.

It is therefore one object of the present invention to provide a fuel cap that provides a lost motion driving connection of a predetermined amount in the cap-removal direction between the handle and the closure to prevent unseating of the seal established between the closure when the handle is rotated unintentionally in the cap-removal direction.

Another object of the present invention is to provide a fuel cap that will provide a direct driving connection between the handle and the closure after the handle has been rotated a predetermined amount in the cap-removal direction to permit the cap to be removed from the filler neck.

Yet another object of the present invention is to provide a fuel cap in which the handle is releasably retained in an orientation that provides the full amount of predetermined lost motion between the handle and the housing when the cap is rotated in the cap-advancing direction to install the cap in the filler neck.

According to the present invention, a cap is provided for use in the filler neck of a fuel tank. The cap includes a closure or housing for closing the filler neck and a handle for rotating the closure relative to the filler neck. The cap also includes a delayed actuation device that is configured to provide a lost motion driving connection between the handle and the closure to permit the handle to rotate through a predetermined angle relative to the closure when the handle is rotated in a cap-removal direction.

One feature of the foregoing structure is that the delayed actuation device is configured to create a lost motion driving connection between the handle and the closure. When the handle is rotated in a cap-removal direction, the handle is permitted to rotate through a predetermined angle relative to the closure before establishing a driving connection therewith to delay breaking the seal between the closure and the filler neck. This feature advantageously aids in increasing the crashworthiness of the fuel cap by lessening the likelihood that the fuel cap will loosen an amount sufficient to break the seal during an accidental impact.

In preferred embodiments of the present invention, the delayed actuation device includes a drive lug coupled to the handle and a pair of driven lugs coupled to the closure. The first driven lug is oriented to engage the drive lug during rotation of the handle in a cap-advancing direction. The second driven lug is located in spaced-apart relation to the first driven lug and is configured to engage the drive lug during rotation of the handle in a cap-removal direction.

One feature of the foregoing structure is that the drive lug coupled to the handle is oriented between two spaced-apart driven lugs coupled to the closure. One advantage of this feature is that the space between the two driven lugs can be selected at the design stage to "program" the predetermined lost motion angle through which the handle and drive lug are permitted to rotate relative to the driven lugs coupled to the closure.

Also in preferred embodiments of the present invention, the delayed actuation device includes a torque-releasable race for selectively disabling a driving connection that is established between the handle and the closure in the cap-advancing direction to permit the handle to rotate relative to the closure through an angle greater than the predetermined angle in response to application of a rotation-inducing torque that is in excess of a predetermined threshold amount.

One feature of the foregoing structure is that the handle is connected for driving engagement to the closure by a torque-releasable race that is configured to permit the handle to rotate relative to the closure in the cap-advancing direction after the closure has been fully engaged in the filler neck in response to a rotation-inducing torque in excess of a predetermined threshold amount. One advantage of this feature is that the torque-releasable race prevents overtightening of the closure within the filler neck.

Also in preferred embodiments of the present invention, the delayed actuation device includes an anti-drift lug that is configured to releasably limit rotation of the handle relative to the race when the closure is installed in the filler neck so that drifting rotation of the handle is substantially blocked in this position.

One feature of the foregoing structure is that the anti-drift lug acts to limit rotation of the handle relative to the race when the cap is installed in the filler neck. One advantage of this feature is that drifting rotation of the handle relative to the race, and consequently relative to the closure, is prevented when the cap is installed in the filler neck. This places the handle in an orientation that advantageously permits the full predetermined angle of lost motion rotation with respect to the closure upon rotation of the handle in the cap-removal direction to prevent premature unseating of the closure from the filler neck.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

FIG. 1 is a side elevational view of the fuel cap of the present invention with portions broken away;

FIG. 2 is an exploded perspective view of the drive hub and race elements; and

FIG. 3 is a sectional view taken along lines 3—3 of FIG. 2.

DETAILED DESCRIPTION OF THE DRAWINGS

A fuel cap 10 for closing a filler neck 28 of a vehicle or other fuel system is illustrated in FIGS. 1–3. A delayed actuation device within the cap 10 permits a predetermined amount of lost motion to be established between a shell or handle 12 and a closure or housing 26. This predetermined amount of lost motion advantageously increases the crashworthiness of the cap 10 by aiding in preventing unintentional loosening of the housing 26 from the filler neck 28 under certain conditions.

Referring to FIG. 1, the cap 10 includes the shell or handle 12 that is configured to permit the operator to impart rotational torque to the cap 10. The shell 12 includes an upstanding wall 14 that is configured to define an axially extending bore 16. The shell 12 also includes two upstanding faces 18 (only one of which is shown in FIG. 1) that extend in parallel relation radially outwardly from the upstanding wall 14. Each upstanding face 18, at its axially lower edge, abuts a planar downwardly-facing surface 20 which extends radially outwardly from and perpendicular to, the lower edge of the face 18. The shell 12 terminates in a peripherally and circumferentially extending lip 22.

A closure member or housing 26 is provided that is configured to threadingly engage a threaded filler neck 28 in a conventional manner. The filler neck 28 terminates in an outwardly and downwardly extending sealing lip 30. A gasket 32 is provided that is configured to seat against the sealing lip 30 and the housing 26 to provide a fluid-tight seal when the housing 26 is fully engaged into the filler neck 28.

A pressure-vacuum valve assembly 38 is shown in phantom for illustrative purposes only in its conventional position disposed in the housing 26. The pressure-vacuum valve assembly 38 controls the venting of fuel vapor from the fuel tank when the pressure within the tank reaches a predetermined, superatmospheric level. The pressure-vacuum valve assembly 38 also controls the venting of air into the fuel tank when the pressure in the tank decreases to a predetermined, sub-atmospheric level. The pressure-vacuum valve assembly 38 is a conventional unit, and well known by those skilled in the art.

In addition, it will be understood that the novel features of the present invention are unrelated to the function of the pressure-vacuum valve assembly 38. Therefore, the inclusion of the assembly 38 is shown for illustrative purposes only. The cap 10 of the present invention will function regardless of the inclusion or omission of a pressure-vacuum valve assembly similar to the assembly 38.

The housing 26 includes a radially outwardly extending flange 36 at an axially upper portion of the housing 26. Four peripherally and slightly axially upwardly extending resilient fingers 40 are attached to the flange 36. Each of the resilient fingers 40 terminates in a pawl tooth 42. The flange 36 also includes a circumferential groove 44 formed in its axially upper surface. The groove 44 acts to weaken somewhat the flange 36 to permit the outermost portion of the flange to be broken away should the shell 12 be exposed to an impact. By permitting the outermost portion of the flange 36 to be broken away, the seal established between the housing 26 and the filler neck 28 is substantially unaffected by such an impact.

An annular race 46 is disposed within the shell 12 between the two spaced-apart, planar, downwardly-facing surfaces 20 and the axially upper portion of the flange 36. The race 46 is provided to cooperate in a known manner with the resilient fingers 40, and specifically with the pawl teeth 42 to provide a torque-overriding connection of race 42 to the housing 26 in the cap-advancing direction to permit advancement of the closure 26 into the filler neck 28. In addition, the race 46 cooperates with the pawl teeth 42 to provide a direct connection of the race 46 to the housing 26 in the cap-removal direction to permit removal of the housing 26 from the filler neck 28. The cooperation of the resilient fingers 40 and the race 46 to provide the torque-overriding connection in one direction and the direct connection in the other direction is well known in the art, and is specifically described in U.S. Pat. No. 4,280,346 to Evans, the entire specification and disclosure of which is hereby incorporated by reference.

A drive hub 50 is rigidly attached to the shell 12 as shown best in FIG. 1 to permit establishment of a driving connection between the shell 12 and the race 46. The drive hub 50 includes a radially outwardly extending arm 52 that terminates in a drive lug 54. The drive hub 50 is received within the axially extending bore 16 in the shell 12, with the axially lower end 55 of the wall 14 rigidly attached to the radially outwardly-extending base 56 of the drive hub 50 by any suitable means, for example sonic or ultrasonic welding, to form a weld 57.

The drive lug 54 on the hub 50 is configured to cooperate with an arcuately-shaped driven lug 58 that is disposed on the inner periphery of the race 46 (the drive hub 50 and race 46 are shown in greater detail in FIG. 2). The driven lug 58 on the race 46 includes a first driven face 60 and an opposing second driven face 62.

Two spaced-apart drive ribs 66 extend axially upwardly from the drive arm 52 to provide shell engagement means. Each one of the drive ribs 66 is configured to engage one of the corresponding upstanding faces 18 of the shell 12, respectively. The drive ribs 66 and the welded base 56 act to impart direct rotational movement of the shell 12 to the drive hub 50 in response to rotation of shell 12. Drive hub 50 further includes two stand-offs 67 situated to flank ribs 66. Each stand-off engages one of the downwardly-facing surfaces 20 as shown best in FIG. 1 to aid in positioning hub 50 relative to shell 12.

A retaining rim 68 is provided to couple the housing 26 and the race 46 to the shell 12. The retaining rim 68 is an annular member that mates with the lip 22 to lock these elements together to form the cap 10. In addition, an appearance cover 70 is provided that includes a barbed probe 71 that is inserted into an opening in the drive hub 50 to secure the cover 70 to the shell 12 and assembled drive hub 50. The appearance cover 70 functions to provide a cover for the axially extending bore 16 once the cap 10 has been assembled.

FIG. 2 shows the drive hub 50 and race 46 in greater detail. As described previously, the race 46 includes pockets 74 that are formed between spaced-apart teeth 76. Each tooth 76 includes an angled face 78 and an upright face 80. The angled faces 78 and upright faces 80 cooperate with the pawl teeth 42 on the resilient fingers 40 as described previously to impart rotational movement to the housing 26.

The drive lug 54 on the drive hub 50 includes a first drive face 88 and an opposite, second drive face 90. The first drive face 88 is adapted to abut the first driven face 60 on the race 46 to impart rotational movement to the race 46 in a cap-removal direction (counterclockwise in FIG. 2). The second drive face 90 is configured to abut the second driven face 62 to impart rotational movement to the race 46 in the cap-advancing direction (clockwise in FIG. 2).

The arcuate spacing in the clockwise direction between the first driven face 60 and the second driven face 62 provides a predetermined angle or arcuate dimension in which rotation of the drive hub 50 does not act to impart rotational movement to the race 46. Thus, the arcuate spacing between the first driven face 60 and the second driven face 62 provides a predetermined lost motion dimension between the drive hub 50 and the race 46, and consequently between the drive hub 50 and the housing 26. This arcuate dimension between the first driven face 60 and the second driven face 62 is denoted by the number 96. Because the shell 12 is rigidly connected to the drive hub 50, the arcuate dimension 96 corresponds to a predetermined amount of lost motion between the shell 12 and the closure 26. In other words, the first and second driven faces 60, 62 are situated in spaced-apart relation to define an arcuate dimension 96 therebetween establishing the magnitude of lost motion available during rotation of the drive lug 54 between positions engaging the first and second driven faces 60, 62.

A resilient arm 92 extends arcuately away from the drive arm 52. An anti-drift lug 94 is disposed at the extreme distal end of the resilient arm 92. The anti-drift lug 94 is sized and configured to be resiliently received within a radially inwardly-opening, V-shaped groove 98 that is formed in the driven lug 58 on the race 46. The V-groove 98 is arcuately spaced alart from the second driven face 62 such that when the second drive face 90 on the drive lug 54 is abutting the second driven face 62, the anti-drift lug 94 will rest in the V-shaped groove 98. The anti-drift lug 94 and V-shaped groove 98 cooperate when the drive hub 50 is in this position to prevent any drifting rotational movement of the drive hub 50 with respect to the race 46. This feature will be discussed below in the description relating to FIG. 3.

The operation of the race 46 to impart rotational movement to the housing 26 in response to rotation of hub 50 is illustrated in FIG. 3. As noted above, hub 50 is keyed to rotate with shell 12 due to engagement of drive ribs 66 on hub 50 and upstanding faces 18 on shell 12. A cap-advancing orientation of hub 50 is illustrated in dotted lines in FIG. 3 while a cap-removal orientation of hub 50 is illustrated in solid lines in FIG. 3 to demonstrate the "lost motion" capability of delayed actuation fuel cap 10. Specifically, FIG. 3 shows the relationship between the first drive face 88 and the first driven face 60, the second drive face 90 and the second driven face 62, and the arcuate dimension 96 to provide the predetermined amount of lost motion between the shell 12 and the closure 26.

When the drive hub 50 is in the position shown in solid line in FIG. 3, the first drive face 88 is abutting the first driven face 60. In this orientation, the drive hub 50 is positioned to impart direct rotational movement to the race 46, and consequently to the housing 26, in the cap-removal direction (counterclockwise) to remove the cap 10 from the filler neck 28.

Assuming that the cap 10 is removed from the filler neck 28, and the operator (not shown) desires to insert the cap 10 into the filler neck 28, the shell 12 is rotated in the cap-advancing direction (clockwise) which rotates the drive hub 50 through the arcuate dimension 96 until the second drive face 90 abuts the second driven face 62. As the second drive face 90 approaches the second driven face 62, the anti-drift lug 94 rides over the second driven face 62 and moves along the drive lug 58 until it is resiliently received within the V-shaped groove 98. This cap-advancing orientation is shown in dotted line in FIG. 3.

Once the second drive face 90 is abutting the second driven face 62, further rotational movement of the drive hub 50 in the cap-advancing direction imparts direct rotational movement to the race 46, and consequently to the housing 26. This rotational movement acts to engage the housing 26 in the filler neck 28 and rotatably advance housing 26 toward gasket 32 and sealing lip 30 to seal the filler neck 28. The direct rotational movement of the hub 50, the race 46, and the housing 26 in the cap-advancing direction is continued until the housing 26 is fully engaged in the filler neck 28 and gasket 32 is trapped between flange 36 and sealing lip 30. Further rotation of the shell 12 and drive hub 50 in the cap-advancing direction results in the race 46 rotating with respect to the closure 26 due to the torque-overriding connection between the race 46 and the housing 26 as described previously to prevent overtightening of the housing 26.

Because the anti-drift lug 94 is resiliently received within the V-shaped groove 98, the shell 12 and drive hub 50 are prevented from any drifting rotational movement in the cap-removal direction (counterclockwise). This is advantageous because any drifting rotational movement of the drive hub 50 in the counterclockwise direction would reduce the predetermined amount of lost motion movement available between the drive hub 50 and the race 46. Thus, because the anti-drift lug 94 is resiliently received within the V-shaped groove 98, the maximum amount of predetermined lost motion in the cap-removal direction is maintained in the cap-removal direction when the cap 10 is properly installed in the filler neck 28.

To remove the cap 10 from the filler neck 28, the operator begins rotating the shell 12 in the cap-removal direction. Initial rotation of the shell 12 and drive hub 50 in the cap-removal direction forces the anti-drift lug 94 out of the V-shaped groove 98 without imparting any rotational movement to the race 46 or housing 26. Continued rotational movement of the drive hub 50 in the cap-removal direction moves the first drive face 88 toward the first driven face 60. As illustrated in FIG. 3, the drive hub 50 is rotated for approximately 180° before the first drive face 88 abuts the first driven face 60. Thus, in the illustrated embodiment, the arcuate dimension 96 representing the predetermined amount of lost motion between the drive hub 50 and the race 46 in the cap-removal direction is approximately 180°. Once the first drive face 88 abuts the first driven face 60, continued rotation of the drive hub 50 in the cap-removal direction will impart direct rotational movement to the housing 26 to begin removing the housing 26 from the filler neck 28.

By providing the approximately 180° of lost motion between rotation of the shell 12 with respect to the housing 26 in the cap-removal direction, the crashworthiness of the cap 10 is improved. When the cap 10 is properly installed in the filler neck 28, the drive hub 50 will be in the position illustrated by the dotted line in FIG. 3. Should the vehicle (not shown) be involved in an accident which results in a portion of the vehicle body interacting with the shell 12 to impart rotational movement on the shell 12 in the cap-removal direction, the shell 12 would have to rotate a full 180° before the housing 26 begins to disengage from the filler neck 28. Thus, unless the shell 12 is rotated a full 180°, the housing 26 remains in full sealing contact with the filler neck 28.

Although the invention has been described in detail with reference to a preferred embodiment, variations and modifications exist within the scope and spirit of the invention as described and defined in the following claims.

What is claimed is:

1. A cap for use in the filler neck of a tank, the cap comprising
   closure means for closing the filler neck,
   handle means for rotating the closure means relative to the filler neck, and
   delayed actuation means for providing a lost motion driving connection between the handle means and the closure means.

2. The cap of claim 1, wherein the delayed actuation means interconnects the closure means and the handle means to provide means for limiting relative movement of the closure means and the handle means so that the handle means is mounted for limited rotation through a predetermined angle relative to the closure means between first and second positions.

3. The cap of claim 2, wherein the means for limiting relative movement of the closure means and the handle means includes a drive lug coupled to the handle means and a pair of driven lugs coupled to the closure means for rotation therewith, one of the driven lugs is situated to engage the drive lug during rotation of the handle means in a cap-advancing direction, and the other of the driven lugs is situated in spaced-apart relation to said one driven lug to engage the drive lug during rotation of the handle means in a cap-removal direction.

4. The cap of claim 2, wherein the delayed actuation means is configured to transmit a rotation-inducing torque from the handle means to the closure means upon rotation of the handle means to one of its first and second positions so that rotation of the handle means through said predetermined angle corresponds to a maximum amount of lost motion of the handle means relative to the closure means prior to establishing a driving connection therebetween.

5. The cap of claim 2, wherein the delayed actuation means further includes torque-releasable means for selectively disabling a driving connection established between the handle means and the closure means to cause the handle means to rotate relative to the closure means through an angle greater than said predetermined angle in response to application of a rotation-inducing torque that is in excess of a predetermined threshold amount.

6. The cap of claim 1, wherein the delayed actuation means includes a drive hub attached to the handle means and a race mounted for rotation relative to the drive hub, and the race includes torque-receiving means for selectively engaging the drive hub upon rotation thereof and torque transmission means for engaging the closure means to transmit a rotation-inducing torque to the closure means upon rotation of the race.

7. The cap of claim 6, wherein the drive hub includes oppositely facing first and second drive faces and the torque-receiving means includes first lug means situated to be driven by the first drive face of the drive hub during installation of the closure means on the filler neck and spaced-apart second lug means situated to be driven by the second drive face of the drive hub during removal of the closure means from the filler neck.

8. The cap of claim 6, wherein the race includes a ring having an inner wall defining an aperture for receiving the drive hub, the torque-receiving means includes an annular lug rigidly attached to the inner wall of the ring and extending in a radially inward direction into the hub-receiving aperture to provide first and second driven faces at opposite ends of the annular lug, and the drive hub includes a radially outwardly extending drive lug for selectively engaging one of the first and second driven faces to transmit a rotation-inducing torque from the handle means to the closure means.

9. The cap of claim 8, wherein the delayed actuation means further includes anti-drift means for releasably limiting rotation of the drive hub relative to the race within a predetermined angular amount when the drive lug of the drive hub is in driving engagement with one of the first and second driven faces of the annular lug so that drifting rotation of the drive hub is substantially blocked when the cap is mounted on the filler neck.

10. A fuel cap for closing the threaded filler neck of a fuel tank, the cap comprising
    a housing having threads for engaging the filler neck,
    sealing means for sealingly engaging said filler neck upon rotation of the housing in a first direction,
    a handle for rotating the housing relative to the filler neck, and hub means for providing a lost-motion driving connection between the handle and the housing, the lost motion of the hub means acting to permit a predetermined amount of relative movement of the handle and the filler neck before rotating the housing relative to the filler neck sufficiently to break the seal provided by the sealing means, the hub means including drive means for applying a rotation-inducing torque to the housing during continued rotation of the handle past said predetermined amount of rotation, the drive means establishing a lost-motion connection between the handle and the housing to delay rotation of the housing relative to the filler neck and breakage of the seal established by the seal means upon rotation of the handle relative to the filler neck.

11. A fuel cap for closing the threaded filler neck of a fuel tank, the cap comprising a housing having threads for engaging the filler neck, sealing means for sealingly engaging said filler neck upon rotation of the housing in a first direction, a handle for rotating the housing relative to the filler neck, and hub means for providing a lost-motion driving connection between the handle and the housing, the lost motion of the hub means acting to permit a predetermined amount of relative movement of the handle and the filler neck before rotating the housing relative to the filler neck sufficiently to break the seal provided by the sealing means, the hub means including a torque-transmission race rotatably mounted intermediate the handle and the housing, the torque-transmission race including means for rotating the housing upon rotation of the torque-transmission race, and a drive lug coupled to the handle for rotation therewith and configured to apply rotation-inducing torque to the torque-transmission race in response to predetermined rotational movements of the handle relative to the housing, thereby establishing the lost-motion connection between the handle and the housing to delay rotation of the housing relative to the filler neck and breakage of the seal established by the sealing means upon rotation of the handle relative to the filler neck.

12. The cap of claim 11, wherein the torque-transmission race further includes first lug means for engaging the drive lug during rotation of the handle in a cap-advancing direction to establish a first driving connection between the handle and the housing and separate second lug means for engaging the drive lug during rotation of the handle in a cap-removal direction to establish a second driving connection between the handle and the housing, and the first and second lug means are situated in spaced-apart relation to define a dimension therebetween establishing the magnitude of lost motion available during rotation of the drive lug between positions engaging the first and second lug means.

13. A fuel cap for use in a fuel system filler neck having a mouth, the cap comprising closure means rotatably engaging the filler neck for closing the filler neck, the closure means including seal means for establishing a seal with the filler neck to block the escape of fuel and fuel vapor in the filler neck to the atmosphere, shell means for providing a hand grip to permit rotation, and actuating means interconnecting the shell means and the closure means for applying a torque to the closure means after a predetermined amount of relative movement of the shell means in the filler neck to establish a lost-motion connection between the closure means and the shell means to delay breaking the seal provided by the seal means until after said predetermined amount of relative movement of the shell means in the filler neck has occurred, the actuating means including a drive hub having first and second drive faces, a race disposed for rotation between the shell means and the closure means, the race cooperating with the closure means to provide a positive connection in the cap-removal direction and a torque-limited connection in the cap-advancing direction, the race including a driven lug having first and second faces, the first drive face of the drive hub engaging the first face of the driven lug of the race during rotation of the drive hub in the cap-advancing direction to impart a rotation-inducing force to the race and the closure means, the second drive face of the drive hub engaging the second face of the driven lug of the race during rotation of the drive hub in the cap-removal direction to impart a rotation-inducing force to the race and the closure means.

14. The cap of claim 13, wherein the actuating means further includes anti-drift means for releasably limiting rotation of the drive hub relative to the race within a predetermined angular amount when the second drive face of the drive hub is in driving engagement with the second face of the driven lug so that drifting rotation of the drive hub is substantially blocked when the fuel cap is mounted on the filler neck.

15. A cap for use in the filler neck of a tank, the filler neck having an annular lip defining a mouth, the cap comprising gasket means, means blocking the filler neck for urging the gasket means against the annular lip to establish a seal blocking outward flow of fluid and vapor in the filler neck through the filler neck mouth, and means for applying a driving force to move the urging means relative to the annular lip of the filler neck from a gasket means-tightening position establishing said seal to a gasket means-releasing position breaking said seal, and the urging means and the applying means cooperating to provide means for permitting relative movement between the urging means and the applying means to delay establishment of a driving connection between the applying means and the urging means during movement of the applying means in a cap-removal direction.

* * * * *